United States Patent
Pang et al.

(10) Patent No.: US 9,322,295 B2
(45) Date of Patent: Apr. 26, 2016

(54) THERMAL ENERGY STORAGE UNIT WITH STEAM AND GAS TURBINE SYSTEM

(71) Applicant: General Electric Company, Schenectady, NY (US)

(72) Inventors: Raymond Pang, Schenectady, NY (US); Huijuan Chen, Schenectady, NY (US); Thomas Arthur Gadoury, Clifton Park, NY (US); Kamlesh Mundra, Clifton Park, NY (US); Andrew Maxwell Peter, Saratoga Springs, NY (US); Duncan George Watt, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 13/653,507

(22) Filed: Oct. 17, 2012

(65) Prior Publication Data
US 2014/0102073 A1    Apr. 17, 2014

(51) Int. Cl.
| F01K 3/00 | (2006.01) |
| F02C 6/18 | (2006.01) |
| F01K 23/10 | (2006.01) |

(52) U.S. Cl.
CPC . *F01K 3/00* (2013.01); *F01K 23/10* (2013.01); *F02C 6/18* (2013.01); *Y02E 20/16* (2013.01)

(58) Field of Classification Search
CPC ......... F01K 23/10; F01K 17/025; F02C 6/14; F02C 6/18; Y02E 20/16
USPC ............................................... 60/659, 39.182
See application file for complete search history.

(56) References Cited

U.S. PATENT DOCUMENTS

| 3,848,416 A | 11/1974 | Bundy |
| 4,089,744 A * | 5/1978 | Cahn ...................... F01K 3/006 |
| | | 376/322 |

(Continued)

FOREIGN PATENT DOCUMENTS

| EP | 2722496 A2 | 4/2014 |
| WO | WO 2007093464 A1 * | 8/2007 ................ F02C 1/05 |

(Continued)

OTHER PUBLICATIONS

Great Britain Intellectual Property Office, Search Report under Section 17 for Application No. GB1321525.6 dated Jul. 30, 2014, 4 pages.

(Continued)

*Primary Examiner* — Phutthiwat Wongwian
*Assistant Examiner* — Eric Linderman
(74) *Attorney, Agent, or Firm* — Ernest G. Cusick; Hoffman Warnick LLC

(57) ABSTRACT

Thermal energy storage is leveraged to store thermal energy extracted from a bottom cycle heat engine. The thermal energy stored in the thermal energy storage is used to supplement power generation by the bottom cycle heat engine. In one embodiment, a thermal storage unit storing a thermal storage working medium is configured to discharge thermal energy into the working fluid of the bottom cycle heat engine to supplement power generation. In one embodiment, the thermal storage unit includes a cold tank containing the thermal storage working medium in a cold state and a hot tank containing the working medium in a heated state. At least one heat exchanger in flow communication with the bottom cycle heat engine and the thermal storage unit facilitates a direct heat transfer of thermal energy between the thermal storage working medium and the working fluid used in the bottom cycle heat engine.

19 Claims, 3 Drawing Sheets

(56) References Cited

U.S. PATENT DOCUMENTS

| | | | |
|---|---|---|---|
| 4,094,148 A | 6/1978 | Nelson | |
| 4,291,537 A | 9/1981 | Oplatka | |
| 4,353,207 A | 10/1982 | Lee | |
| 4,438,630 A * | 3/1984 | Rowe | 60/676 |
| 4,549,401 A | 10/1985 | Spliethoff | |
| 4,806,136 A * | 2/1989 | Kiersz et al. | 62/646 |
| 5,727,379 A * | 3/1998 | Cohn | 60/39.182 |
| 5,865,023 A * | 2/1999 | Sorensen et al. | 60/775 |
| 6,173,563 B1 * | 1/2001 | Vakil et al. | 60/772 |
| 6,220,013 B1 * | 4/2001 | Smith | 60/783 |
| 6,226,976 B1 | 5/2001 | Scott et al. | |
| 6,321,539 B1 | 11/2001 | Bronicki et al. | |
| 6,364,602 B1 | 4/2002 | Andrew et al. | |
| 6,442,924 B1 | 9/2002 | Talley et al. | |
| 6,996,988 B1 * | 2/2006 | Bussard | 60/641.8 |
| 7,171,812 B2 | 2/2007 | Schubert | |
| 7,611,676 B2 | 11/2009 | Inage et al. | |
| 7,726,127 B2 | 6/2010 | Litwin et al. | |
| 7,954,321 B2 | 6/2011 | Shinnar | |
| 8,075,646 B2 * | 12/2011 | Briesch et al. | 48/210 |
| 8,377,356 B2 | 2/2013 | Huang et al. | |
| 8,484,973 B2 * | 7/2013 | Gathmann | F03G 6/005 126/617 |
| 8,567,196 B2 | 10/2013 | Okita et al. | |
| 8,661,777 B2 | 3/2014 | Zohar et al. | |
| 8,701,411 B2 * | 4/2014 | Koketsu et al. | 60/641.8 |
| 8,904,793 B2 * | 12/2014 | Hemrle | F01K 3/12 60/643 |
| 8,925,543 B2 * | 1/2015 | Zillmer | F16L 9/18 126/609 |
| 9,038,387 B2 | 5/2015 | Kaufmann et al. | |
| 9,038,390 B1 | 5/2015 | Krueger | |
| 2003/0182944 A1 * | 10/2003 | Hoffman et al. | 60/772 |
| 2005/0279095 A1 * | 12/2005 | Goldman | 60/641.8 |
| 2007/0017207 A1 | 1/2007 | Smith et al. | |
| 2007/0095068 A1 | 5/2007 | Joshi et al. | |
| 2008/0127647 A1 * | 6/2008 | Leitner | F02C 1/007 60/645 |
| 2008/0233527 A1 * | 9/2008 | Heinrich et al. | 432/13 |
| 2009/0120088 A1 | 5/2009 | Chiller et al. | |
| 2009/0121495 A1 * | 5/2009 | Mills | 290/4 D |
| 2010/0031624 A1 | 2/2010 | Austin et al. | |
| 2010/0031625 A1 | 2/2010 | Narayan et al. | |
| 2010/0175687 A1 * | 7/2010 | Zillmer | F16L 9/18 126/619 |
| 2010/0251712 A1 | 10/2010 | Nakhamkin | |
| 2010/0288571 A1 * | 11/2010 | Dewis et al. | 180/165 |
| 2010/0295306 A1 * | 11/2010 | Ridnik et al. | 290/52 |
| 2010/0319359 A1 | 12/2010 | Holt et al. | |
| 2011/0085917 A1 | 4/2011 | Ward | |
| 2011/0100611 A1 * | 5/2011 | Ohler et al. | 165/104.28 |
| 2011/0162368 A1 | 7/2011 | Schroder et al. | |
| 2011/0271953 A1 * | 11/2011 | Wortmann et al. | 126/619 |
| 2011/0277469 A1 * | 11/2011 | Brenmiller et al. | 60/641.8 |
| 2011/0283700 A1 * | 11/2011 | Zohar et al. | 60/641.15 |
| 2012/0055157 A1 | 3/2012 | Gulen et al. | |
| 2012/0240549 A1 * | 9/2012 | Pang et al. | 60/39.182 |
| 2013/0000272 A1 | 1/2013 | Gulen et al. | |
| 2013/0042621 A1 | 2/2013 | Carroni et al. | |
| 2013/0098313 A1 | 4/2013 | Pang | |
| 2014/0033676 A1 | 2/2014 | Pang et al. | |
| 2014/0102073 A1 * | 4/2014 | Pang et al. | 60/39.182 |
| 2014/0165572 A1 * | 6/2014 | Pang et al. | 60/736 |
| 2014/0223906 A1 | 8/2014 | Gee et al. | |
| 2015/0000248 A1 | 1/2015 | del Omo | |
| 2015/0260463 A1 | 9/2015 | Laughlin et al. | |

FOREIGN PATENT DOCUMENTS

| | | | | |
|---|---|---|---|---|
| WO | WO 2007093474 A1 * | 8/2007 | | F03G 6/005 |
| WO | WO 2009106657 A1 * | 9/2009 | | F01K 7/223 |
| WO | WO 2010032238 A2 * | 3/2010 | | F03G 6/06 |
| WO | WO 2011068880 A2 * | 6/2011 | | F03G 6/065 |
| WO | WO 2012159924 A1 * | 11/2012 | | |

OTHER PUBLICATIONS

Office Action for U.S. Appl. No. 13/715,540, dated Oct. 16, 2015, 30 pages.

Linderman, Office Action Communication for U.S. Appl. No. 13/715,540, dated Feb. 10, 2016, 16 pages.

Linderman, Notice of Allowance and Fee(s) Due for U.S. Appl. No. 13/715,540, dated Mar. 14, 2016, 11 pages.

* cited by examiner

… (US 9,322,295 B2)

THERMAL ENERGY STORAGE UNIT WITH STEAM AND GAS TURBINE SYSTEM

BACKGROUND OF THE INVENTION

The present invention relates generally to power generating plants, and more particularly, to a power generation plant such as, for example, a combined-cycle power plant that incorporates a thermal energy storage unit to supplement or boost steam production and power output.

In a typical operation of a combined-cycle power plant where exhaust energy generated from a gas turbine is used to power a steam turbine, the power output generated from the plant will depend on the period of the day and the load associated therewith. For example, in the early morning hours, the demand for energy is generally lower than other periods in the day, and thus the combined-cycle power plant will operate at a minimum plant turndown load. As the demand for energy increases from these early morning hours, the combined-cycle power plant will ramp up power output to a base load. There will be certain times in the day when the demand for energy peaks. During these peak-demand periods, the thermal efficiency of the combined-cycle power plant will be reduced as power output is increased to meet the peak load. Some combined-cycle power plants utilize duct firing to generate the additional power output to meet the increased demand for energy during these peak-demand periods. Duct firing is inherently a less efficient method of power generation, so the combined-cycle power plant will operate at a thermal efficiency that is less than desirable.

BRIEF DESCRIPTION OF THE INVENTION

In one aspect of the present invention, a power plant is provided. In this aspect of the present invention, the power plant comprises a steam turbine and a steam generating source that supplies a working fluid to the steam turbine. The power plant further comprises a thermal storage unit that stores a thermal storage working medium that is configured to discharge thermal energy into the working fluid supplied from the steam generating source to supplement power generation by the steam turbine. The thermal storage unit includes a cold tank containing the thermal storage working medium in a cold state and a hot tank containing the thermal storage working medium in a heated state. The power plant also comprises a heat exchanger that is in flow communication with the steam turbine, the steam generating source and the thermal storage unit. The heat exchanger facilitates a direct heat transfer of thermal energy between the thermal storage working medium in the thermal storage unit and the working fluid supplied from the steam generating source to the steam turbine.

In another aspect of the present invention, a combined-cycle power plant is provided. In this aspect of the present invention, the combined-cycle power plant comprises a top cycle heat engine operating with a topping thermodynamic cycle that is configured to generate electric energy. The combined-cycle power plant further comprises a bottom cycle heat engine operating with a bottoming thermodynamic cycle that is configured to generate additional electric energy. The bottom cycle heat engine includes a steam generating source that generates a working fluid from exhaust energy produced from the top cycle heat engine to a steam turbine for generation of the additional electric energy. The combined-cycle power plant also comprises a thermal storage unit storing a thermal storage working medium that is configured to discharge thermal energy into the working fluid of the bottom cycle heat engine to supplement power generation of the additional electric energy. The thermal storage unit includes a cold tank containing the thermal storage working medium in a cold state and a hot tank containing the working medium in a heated state. The combined-cycle power plant further comprises at least one heat exchanger in flow communication with the bottom cycle heat engine and the thermal storage unit. The at least one heat exchanger facilitates a direct heat transfer of thermal energy between the thermal storage working medium in the thermal storage unit and the working fluid used in the bottom cycle heat engine.

In a third aspect of the present invention, a combined-cycle power plant is disclosed. In this aspect of the present invention, the combined-cycle power plant comprises a gas turbine, a heat recovery steam generator (HRSG) configured to recover exhaust energy from the gas turbine and generate steam therefrom and a steam turbine configured to receive a supply of steam from the HRSG. The combined-cycle power plant further comprises a thermal storage unit storing a working medium that is configured to discharge thermal energy into the steam supplied from the HRSG to supplement power generation by the steam turbine. The thermal storage unit includes a cold tank containing the thermal storage working medium in a cold state and a hot tank containing the thermal storage working medium in a heated state. The combined-cycle power plant further comprises a heat exchanger in flow communication with the HRSG, the thermal storage unit and the steam turbine. The heat exchanger facilitates a direct heat transfer of thermal energy from the thermal storage working medium in the thermal storage unit and the steam supplied from the HRSG to the steam turbine.

BRIEF DESCRIPTION OF THE DRAWINGS

FIGS. 3A-3B show plots of power plant performance, wherein FIG. 3A shows a power output profile of a power plant such as a combined-cycle power plant depicted in FIGS. 1 and 2, while FIG. 3B shows a heat rate profile of a power plant depicted in FIGS. 1 and 2 with respect to a heat rate profile of a conventional power plant configured without the use of a thermal storage unit as described in the various embodiments of the present invention.

DETAILED DESCRIPTION OF THE INVENTION

Figure 1:
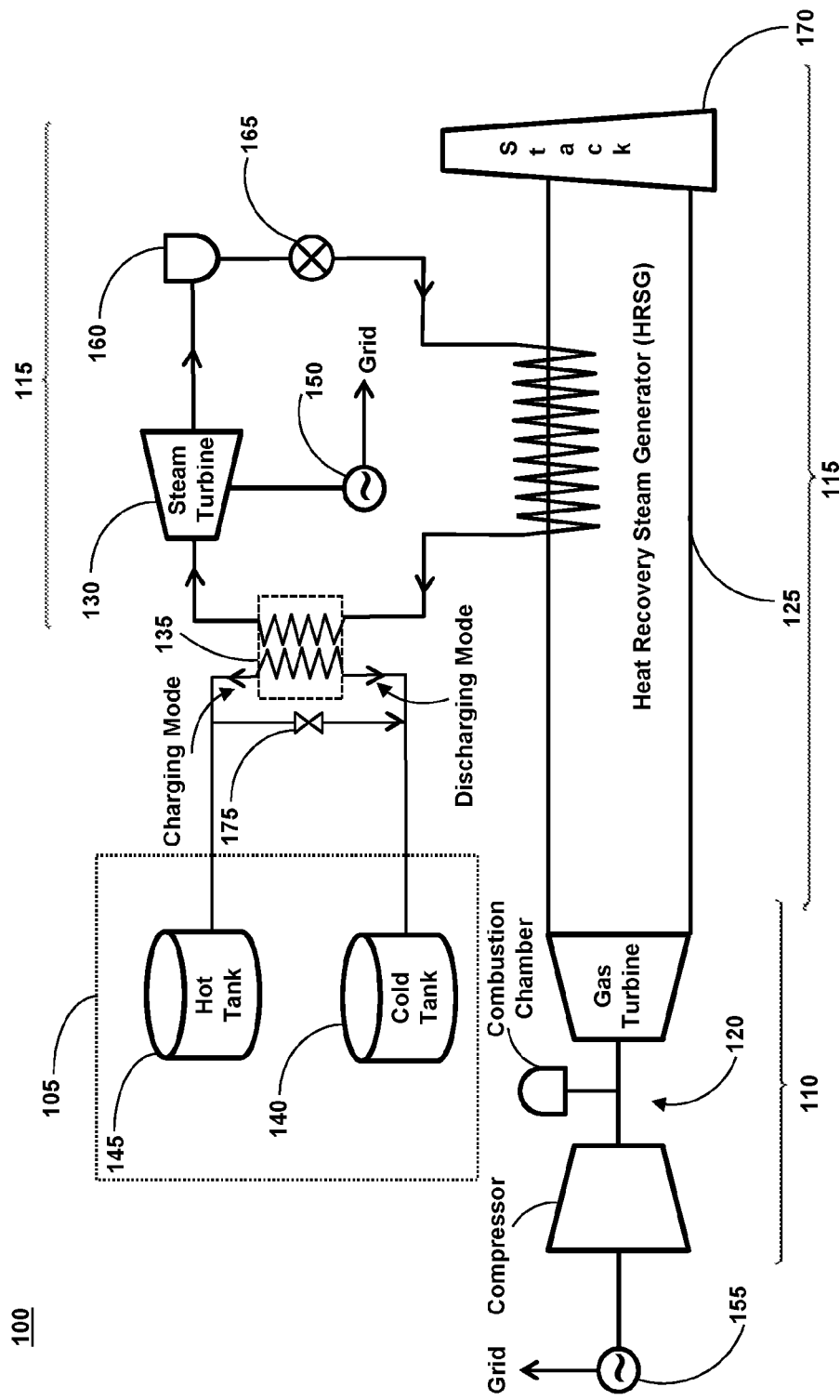
FIG. 1 is a schematic diagram of a power plant with a thermal energy storage unit that is used to supplement or boost steam production and power output according to one embodiment of the present invention.

Various embodiments of the present invention are directed to utilizing a thermal storage unit to supplement or boost steam production and power output of a power plant such as for example a combined-cycle power plant. The thermal storage unit stores a thermal storage working medium that is configured to accommodate operating modes where thermal energy is discharged into the working fluid supplied from a steam generating source to supplement power generation by a steam turbine operating the power plant, and where the steam generating source charges, or increases the temperature of the thermal storage working medium. The thermal storage unit includes a cold tank containing the thermal storage working medium in a cold state and a hot tank containing the thermal storage working medium in a heated state. In one embodiment, the working medium contained in the thermal storage unit may comprise an inorganic salt such as molten salt. In operation, at least one heat exchanger is in flow communication with the steam turbine, the steam generating source and the thermal storage unit. The at least one heat exchanger facilitates a direct heat transfer of thermal energy between the thermal storage working medium in the thermal storage unit and the working fluid supplied from the steam generating source to the steam turbine.

In one embodiment, the thermal storage working medium in the thermal storage unit is used to supplement the steam supplied from the steam generating source to the steam turbine during peak-demand periods. In another embodiment where the power plant is a combined-cycle power plant, the thermal storage working medium in the thermal storage unit is used to supplement the steam supplied from the steam generating source such as a heat recovery steam generator (HRSG). This enables the combined-cycle power plant to boost steam production and power output. In another embodiment, the at least one heat exchanger can discharge thermal energy from the thermal storage working medium in the thermal storage unit back to the HRSG in order to improve warm-up times of the HRSG. In addition, it can increase exhaust temperature of a gas turbine during its startup for embodiments where gas turbine exhaust energy is used to generate a source of steam for the steam turbine. In another embodiment, the thermal storage working medium in the thermal storage unit is used to supplement the steam supplied from the steam generating source in order to provide an energy boost to an electricity supply grid receiving power from the power plant. In some instances, supply grid frequency can decrease substantially in response to elevated electrical power demand that is not satisfied at the existing frequency. In these cases the energy boost facilitated by the use of the thermal storage working medium can function to offset any frequency decrease on the electricity supply grid.

The above-mentioned technical effects are illustrative of some of the applications of the various embodiments of the present invention and are not intended to be restrictive. These technical effects and others associated with the embodiments of the present invention are described below in more detail.

Referring now to the figures, FIG. 1 shows a schematic diagram of a power plant 100 with a thermal energy storage unit 105 that is used to supplement or boost steam production and power output according to one embodiment of the present invention. The power plant 100 illustrated in FIG. 1 is a combined-cycle power plant that includes a top cycle heat engine 110 operating with a topping thermodynamic cycle that is configured to generate electric energy and a bottom cycle heat engine 115 operating with a bottoming thermodynamic cycle that is configured to generate additional electric energy. Although the description that follows pertains to a combined-cycle power plant, those skilled in the art will appreciate that the various embodiments of the present invention are suitable for any type of power plant that utilizes a steam turbine engine. An illustrative, but non-exhaustive, listing of power plants that utilize a steam turbine engine and that is suitable for deploying embodiments of the present invention can include fossil-fuel power plants, nuclear power plants, solar power plants, geothermal power plants, and other renewable energy power plants.

As shown in FIG. 1, top cycle heat engine 110 includes a gas turbine 120 including a compressor section (C), a combustor chamber section (CC) and a gas turbine section (GT). Those skilled in the art will appreciate that gas turbine 120 is only one example of a gas turbine engine configuration that can be employed with a combined-cycle power plant and is not intended to limit the various embodiments of the present invention described herein. As used herein, top cycle heat engine 110 generally refers to gas turbine 120 including the compressor section, combustor chamber section and gas turbine section as the primary components, however, other components of the top cycle heat engine not illustrated in FIG. 1 may include a gas fuel skid with a fuel heater and flow control valves, variable actuating inlet guide vanes, an exhaust diffusor, a compressor inlet housing with cooling system. Bottom cycle heat engine 115 refers to all components in FIG. 1 that are not associated with gas turbine 120, excluding thermal storage unit 105 and a heat exchanger 135 which are described below in more detail. That is, bottom cycle heat engine 115 includes an HRSG 125, a steam turbine 130, a condenser 160, a pump 165 as illustrated in FIG. 1 and other components not specifically shown such as the balance of power plant 100 and associated auxiliary equipment.

Continuing with the description of bottom cycle heat engine 115, HRSG 125 uses exhaust energy from gas turbine 120 to generate a source of steam supplied to steam turbine 130 via heat exchanger 135. HRSG 125 is only one example of a steam generation source that can be used to generate a working fluid of water/steam for expansion in steam turbine 130 and those skilled in the art will appreciate that other steam generation sources exist including HRSGs that generate steam at two or three pressure levels, and with or without reheat superheater sections. Those skilled in the art will further appreciate that the steam turbine can be comprised of multiple sections such as a high-pressure section, an intermediate-pressure section, and a low-pressure section, each possibly including dedicated piping connections to the HRSG 125. HRSG 125 supplies the working fluid of water/steam to steam turbine 130. The working fluid undergoes expansion in steam turbine 130 and is used to drive a generator 150. Generator 150 generates electric power and produces electricity for distribution to an electricity supply grid. Note that gas turbine 120 also drives a generator 155 that generates electricity for distribution to the electricity supply grid. Note that in some configurations the gas turbine and steam turbine can be on a common shaft and both contributing power to a single generator. Referring back to bottom cycle heat engine 115, condenser 160 condenses the expanded working fluid from steam turbine 130 to produce a liquid (condensate) that is fed back into HRSG 125 by pump 165. By-products from HRSG 125 are released into the atmosphere via a stack 170.

Thermal storage unit 105 along with heat exchanger 135 can be used to supplement power generation (e.g., boost steam production and power output) by steam turbine 130. In one embodiment, a thermal storage working medium stored in thermal storage unit 105 can discharge thermal energy into the working fluid supplied from HRSG 125 to steam turbine 130 via heat exchanger 135, which is in flow communication with these components. In this manner, heat exchanger 135 facilitates a direct heat transfer of thermal energy between the thermal storage working medium stored in thermal storage unit 105 and the working fluid (e.g., water/steam) supplied from HRSG 125 to steam turbine 130.

As shown in FIG. 1, thermal storage unit 105 includes a cold tank 140 containing the thermal storage working medium in a cold state and an insulated hot tank 145 containing the thermal storage working medium in a heated state. In one embodiment, the thermal storage working medium utilized by thermal energy storage unit 105 in cold tank 140 and hot tank 145 may comprise any one of a number of storage media of a type having the capacity to absorb, retain and then release thermal energy in any desired duty cycle. In addition, the thermal storage working medium should possess high heats of fusion, broad operative temperature ranges, and relative inertness. An illustrative, but non-exhaustive, example of a thermal storage working medium that can be utilized by thermal energy storage unit 105 includes an inorganic salt such as a molten salt. Those skilled in the art will appreciate that other chemical inorganic compounds can be used as the thermal storage working medium. For example, alkali metal hydroxides such as sodium hydroxide are types of inorganic compounds that can be used as the thermal storage working medium.

In the embodiments of the present invention there are generally three modes of operation that thermal storage unit 105 and heat exchanger 135 may be used within power plant 100. One mode of operation is a thermal storage unit off mode of operation where all of the generated working fluid (e.g., water/steam) from HRSG 125 is directly sent to steam turbine 130 for expansion work. In the thermal storage unit off mode, HRSG 125 is configured to supply all of the working fluid directly to steam turbine 130 without any heat transfer with the thermal storage working medium in thermal storage unit 105 via heat exchanger 135. In addition, during the thermal storage unit off mode, a predetermined amount of the thermal storage working medium in hot tank 145 in the heated state can be supplied to the thermal storage working medium in the cold state in cold tank 140 via a bypass valve 175. Since the thermal storage unit is off, there is a possibility that the thermal storage working medium will solidify. Supplying a minimum amount of the thermal storage working medium in hot tank 145 to the thermal storage working medium in cold tank 140 via a bypass valve 175 enables the cold tank to maintain a minimum temperature therein to inhibit solidification of the working medium.

Another mode of operation is a charging mode of operation where the working fluid from HRSG 125 is supplied to steam turbine 130 and the thermal storage working medium in cold tank 140 is supplied to heat exchanger 135. This facilitates a direct heat transfer of thermal energy between the working fluid supplied from HRSG 125 and the thermal storage working medium. More specifically, this facilitates a direct heat transfer of thermal energy between the working fluid used in bottom cycle heat engine 115 and the thermal storage working medium producing a heated thermal storage working medium. That is, the thermal storage working fluid is charged directly by bottom cycle heat engine 115. This obviates a direct heat transfer with top cycle heat engine 110. Thus, the thermal storage working fluid 105 is charged without any direct interaction with the topping cycle 110 exhaust energy.

A result of the charging mode of operation is that the temperature of the thermal storage working medium is increased, producing a heated thermal storage working medium. The heated thermal storage working medium can then be stored in hot tank 145. Note that in the charging mode of operation, HRSG 125 supplies the working fluid to steam turbine 130 in parallel or simultaneously while heat exchanger 135 facilitates the direct heat transfer of thermal energy between the working fluid and the thermal storage working medium. This charging mode of operation may cause a decrease in power output from steam turbine 130 as the flow of the working fluid and/or its temperature as supplied will be lower. This potential condition makes the charging mode of operation suitable for occurring during instances when the value of electrical output is deemed to be relatively low (e.g., overnight or during a mild season). However, those skilled in the art will appreciate that the charging mode of operation can be implemented during any plant load point between minimum turndown all the way to a base load.

The third mode of operation is the discharging mode of operation where the working fluid generated via the exhaust energy of gas turbine 120 and HRSG 125 with the thermal storage working fluid circulating from hot tank 145 to cold tank 140 via heat exchanger 135, is used to boost steam production and power output by steam turbine 130. In this manner, the working fluid supplied to steam turbine 130 for expansion is based concurrently on the energy provided by the exhaust energy of gas turbine 120 delivered to HRSG 125 and the discharge of thermal energy from the thermal storage working fluid from thermal storage unit 105. More specifically, the working fluid supplied to steam turbine 130 for expansion is a function of both the exhaust energy of top cycle heat engine 110 and the discharge of thermal energy from the thermal storage working medium into the working fluid of bottom cycle heat engine 115 via heat exchanger 135.

The discharging mode of operation to boost steam production and power output from steam turbine 130 makes power plant 100 suitable for several applications. In one embodiment, the discharging mode of operation makes power plant 100 suitable for use in instances where it is desirable to boost steam production and power output from the steam turbine such as during peak-demand periods. This obviates or reduces the need to use duct firing to generate the additional power output to meet the increased demand for energy during these peak-demand periods. In another embodiment, the discharging mode of operation makes power plant 100 suitable for use in instances where it is desirable to provide an energy boost to an electricity supply grid to offset unmet grid demand. In particular, power plants connected to a supply grid are often asked to boost their electrical output quickly in order to make up for lost capacity elsewhere in the grid. The capacity to boost steam production and power output from the steam turbine via the discharging mode enables power plant 100 to quickly provide an energy boost to the grid to offset any instability in frequency. In another embodiment, the discharging mode of operation can be used to discharge thermal energy from the thermal storage working medium in thermal storage unit 105 into HRSG 125 during a startup from a relatively cold condition to reduce overall plant startup time.

Figure 2:
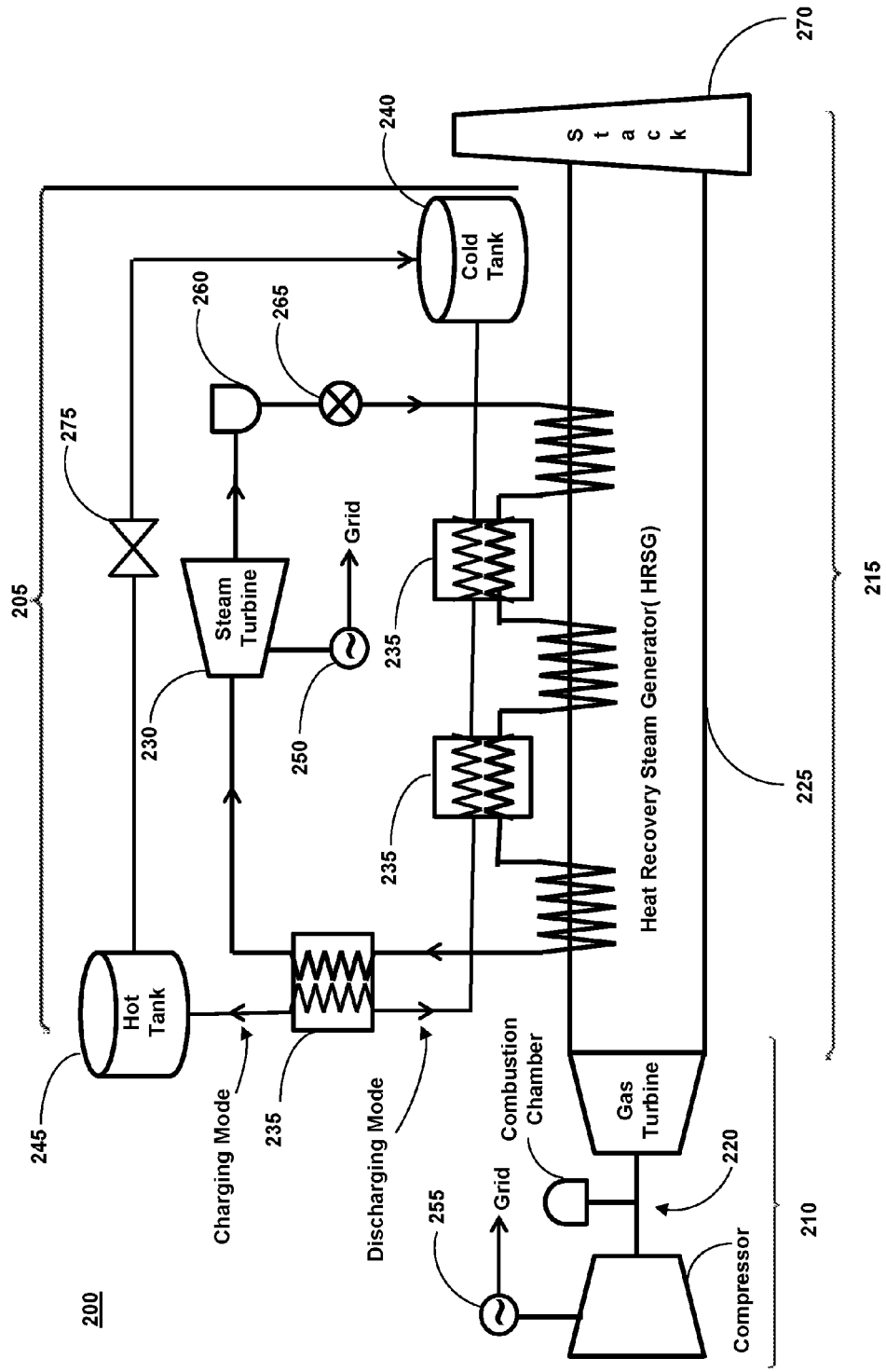
FIG. 2 is a schematic diagram of a power plant with a thermal energy storage unit using more than one heat exchanger to supplement steam production and power output according to another embodiment of the present invention.

FIG. 2 is a schematic diagram of a power plant 200 with a thermal energy storage unit using more than one heat exchanger to supplement steam production and power output according to another embodiment of the present invention. Parts in FIG. 2 that are similar to parts used in FIG. 1 are applied with like reference elements, except that the reference elements used in FIG. 2 are preceded with the numeral 2. In this embodiment, each heat exchanger 235 is configured to perform both charging of the thermal storage working medium in thermal storage unit 205 with the working fluid from bottom cycle heat engine 215 and discharging the thermal storage working medium from the thermal storage unit into the working fluid used in the bottom cycle heat engine.

In one example, heat transfer between the thermal storage working medium and the working fluid may occur through the use of two to three heat exchangers 235 in both the charging mode and discharging mode. It is possible and economically desirable to position and size one or more of the heat exchangers 235 such that it can be utilized in both operating modes to reduce the overall number of required heat exchangers, which potentially reduces overall cost and complexity. In other words, if three heat exchangers 235 are required for charging and discharging, only four or five total heat exchangers would be required, with one or two heat exchangers working in both modes. Those skilled in the art will appreciate the example of two or three heat exchangers is for illustration only and incremental performance benefits could be achieved by adding one or more additional heat exchangers. Those skilled in the art will further appreciate that potentially multiple heat exchangers can be used in both the charging and discharging modes to provide economic and operating benefits.

Figure 3B:
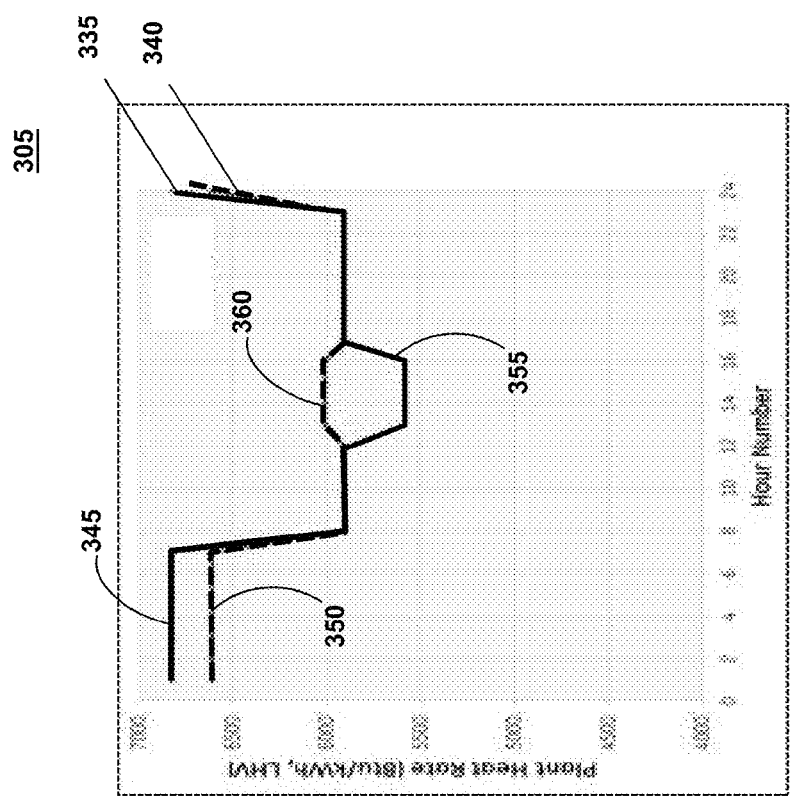
Figure 3A:
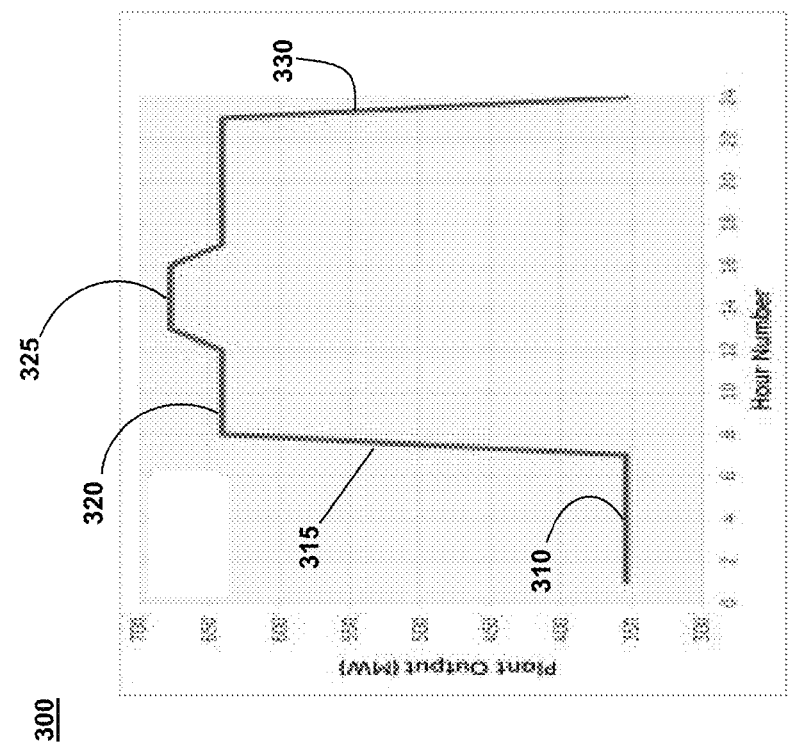

FIGS. 3A-3B show plots of power plant performance, wherein FIG. 3A shows an idealized power output profile 300 of a power plant such as a combined-cycle power plant depicted in FIGS. 1 and 2, while FIG. 3B shows a heat rate profile 305 of a power plant depicted in FIGS. 1 and 2 with respect to a heat rate profile of a power plant configured without the use of a thermal storage unit as described in the various embodiments of the present invention. Referring to FIG. 3A, power output profile 300 shows that between hours one and seven, the power plant is operating at a minimum plant turndown load as indicated in the profile by reference element 310. From hours seven to eight, the power plant starts to ramp up power output to a base load as indicated in the profile by reference element 315. Between hours eight and 23, the plant operates at the base load as indicated in the profile by reference element 320. Hours 13 to 16 as indicated in the profile by reference element 325 represent the peak demand hours of the day where the power plant needs to typically generate additional power to meet the peak demand loads. As described herein, the various embodiments of the present invention leverage the thermal storage unit and the heat exchanger(s) from the steam bottoming cycle, store it, and then re-inject this thermal energy at peak demand to boost steam production and power output. This is in contrast to a conventional combined-cycle power plant which would typically have to rely on duct firing to boost steam production to meet the peak demand loads at 325. After operating at the base load, the power plant operates at a part load from hours 23 to 24 as indicated in the profile by reference element 330.

Referring to FIG. 3B, heat rate profile 305 includes a heat rate profile 335 for a power plant depicted in FIGS. 1 and 2 and a heat rate profile 340 of a conventional power plant that uses duct firing to boost steam production during peak demand hours. As is known in the art, the inverse of a power plant's heat rate is representative of the plant's efficiency. Thus, the lower the power plant's heat rate, the better the plant efficiency. Conversely, the higher the power plant's heat rate, the lower the plant efficiency.

In FIG. 3B, between hours one and seven where the power plant is operating at a minimum plant turndown load, the heat rate of a power plant operating according to the embodiments of the present invention as indicated by reference element 345 has a higher heat rate in comparison to the heat rate of a conventional combined-cycle power plant operating as indicated by reference element 350. This indicates that a power plant operating according to the embodiments of the present invention has a lower efficiency at minimum plant turndown load in comparison to the conventional power plant. This is due to the charging mode of operation in which the working fluid from the HRSG is supplied to the steam turbine and the thermal storage working medium in the cold tank is supplied to the heat exchanger(s) to facilitate a direct heat transfer of thermal energy between the HRSG working fluid and the thermal storage working medium. Those skilled in the art will appreciate that despite the lower efficiency between hours one and seven, the value of the electrical output during this time is deemed to be relatively low, making the lower efficiency acceptable in light of the benefit provided during peak demand hours by the various embodiments of the present invention.

As shown in FIG. 3B, during hours 13 to 16 where peak demand is at its highest, the heat rate of a power plant operating according to the embodiments of the present invention as indicated by reference element 355 has a lower heat rate in comparison to the heat rate of a conventional combined-cycle power plant operating as indicated by reference element 360. In particular, this indicates that the embodiments of the present invention enable the power plant to operate at a higher efficiency during peak demand hours in comparison to the conventional power plant using duct firing. This is due to embodiments of the present invention leveraging the charged thermal storage working medium and discharging it into the steam turbine to boost steam production and power output. This is in contrast to a conventional combined-cycle power plant which is burning more fuel during duct firing in order to boost steam production and power output to meet peak demand loads.

Between hours 23 and 24, the power plant is operating at a part load. As shown in FIG. 3B, the heat rate of a power plant operating according to the embodiments of the present invention has substantially the same heat rate, and thus the same efficiency, as the conventional combined-cycle power plant. FIG. 3B also illustrates that the heat rate of a power plant operating according to the embodiments of the present invention has substantially the same heat rate, and thus the same efficiency, as the conventional combined-cycle power plant during hours seven and eight as the plant ramps up power output to a base load. In FIG. 3B, the heat rates and efficiency of the plants are substantially the same from hours eight to twelve while at the base load prior to peak demand hours (i.e., 13 to 16), and after the peak demand hours at the base load from hours 17 to 23.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A power plant, comprising:
   a steam turbine;
   a heat recovery steam generator that supplies steam to the steam turbine;
   a thermal storage unit storing a thermal storage working medium that is configured to discharge thermal energy into the steam supplied from the heat recovery steam generator to supplement power generation by the steam turbine, wherein the thermal storage unit includes a cold tank containing the thermal storage working medium in a cold state and a hot tank containing the thermal storage working medium in a heated state; and
   at least two heat exchangers in flow communication with the steam turbine, the heat recovery steam generator and the thermal storage unit, the at least two heat exchangers facilitating a direct heat transfer of thermal energy between the thermal storage working medium in the thermal storage unit and the steam supplied from the heat recovery steam generator to the steam turbine,
   wherein the thermal storage working medium is heated by the steam supplied from the heat recovery steam generator, and
   wherein the at least two heat exchangers are arranged in series with the hot tank and the cold tank to form a first loop, the at least two heat exchangers are arranged in series with the heat recovery steam generator and the steam turbine to form a second loop, and the first loop and second loop are thermally connected in parallel by the at least two heat exchangers.

2. The power plant according to claim 1, wherein the thermal storage working medium in the cold tank is supplied to at least one of the at least two heat exchangers in a charging mode of operation that facilitates a direct heat transfer of thermal energy between the steam supplied from the heat recovery steam generator and the thermal storage working medium producing a heated thermal storage working medium.

3. The power plant according to claim 2, wherein the heat recovery steam generator supplies the steam to the steam turbine simultaneously while at least one of the at least two heat exchangers facilitates the direct heat transfer of thermal energy between the steam and the thermal storage working medium during the charging mode of operation.

4. The power plant according to claim 2, wherein the heated thermal storage working medium is stored in the hot tank.

5. The power plant according to claim 1, wherein the heat recovery steam generator is configured to supply all of the steam directly to the steam turbine without any heat transfer with the thermal storage working medium via the at least two heat exchangers during a thermal storage unit off mode of operation.

6. The power plant according to claim 5, wherein a predetermined amount of the thermal storage working medium in the hot tank is supplied to the thermal storage working medium in the cold tank during the thermal storage unit off mode of operation to inhibit solidification of the thermal storage working medium in the cold tank.

7. The power plant according to claim 1, wherein the discharge of the thermal storage working medium in the thermal storage unit into the steam supplied from the heat recovery steam generator occurs in instances where it is desirable to boost steam production and power output from the steam turbine during peak-demand periods.

8. The power plant according to claim 1, wherein the discharge of the thermal storage working medium in the thermal storage unit into the steam supplied from the heat recovery steam generator occurs in instances where it is desirable to provide an energy boost to an electricity supply grid to offset any frequency decrease on the grid.

9. The power plant according to claim 1, wherein the thermal storage working medium comprises an inorganic salt.

10. A combined-cycle power plant, comprising:
a gas turbine;
a heat recovery steam generator (HRSG) configured to recover exhaust energy from the gas turbine and generate steam therefrom;
a steam turbine configured to receive a supply of steam from the HRSG;
a thermal storage unit storing a thermal storage working medium that is configured to discharge thermal energy into the steam supplied from the HRSG to supplement power generation by the steam turbine, wherein the thermal storage unit includes a cold tank containing the thermal storage working medium in a cold state and a hot tank containing the thermal storage working medium in a heated state; and
at least two heat exchangers in flow communication with the HRSG, the thermal storage unit and the steam turbine, the heat exchanger facilitating a direct heat transfer of thermal energy from the thermal storage working medium in the thermal storage unit and the steam supplied from the HRSG to the steam turbine,
wherein the thermal storage working medium is heated by the steam supplied from the heat recovery steam generator, and
wherein the at least two heat exchangers are arranged in series with the hot tank and the cold tank to form a first loop, the at least two heat exchangers are arranged in series with the HRSG and the steam turbine to form a second loop, and the first loop and second loop are thermally connected in parallel by the at least two heat exchangers.

11. The combined-cycle power plant according to claim 10, wherein the thermal storage working medium in the cold tank is supplied to at least one of the at least two heat exchangers in a charging mode of operation that facilitates a direct heat transfer of thermal energy between the steam supplied from the HRSG and the thermal storage working medium producing a heated thermal storage working medium.

12. The combined-cycle power plant according to claim 11, wherein the HRSG supplies the steam to the steam turbine simultaneously while at least one of the at least two heat exchangers facilitates the direct heat transfer of thermal energy between the steam and the thermal storage working medium during the charging mode of operation.

13. The combined-cycle power plant according to claim 11, wherein the heated thermal storage working medium is stored in the hot tank.

14. The combined-cycle power plant according to claim 10, wherein the HRSG is configured to supply all of the steam directly to the steam turbine without any heat transfer with the thermal storage working medium via the at least two heat exchangers during a thermal storage unit off mode of operation.

15. The combined-cycle power plant according to claim 14, wherein a predetermined amount of the thermal storage working medium in the hot tank is supplied to the thermal storage working medium in the cold tank during the thermal storage unit off mode of operation to inhibit solidification of the thermal storage working medium in the cold tank.

16. The combined-cycle power plant according to claim 10, wherein the discharge of the thermal storage working medium in the thermal storage unit into the steam supplied from the HRSG occurs in instances where it is desirable to boost steam production and power output from the steam turbine during peak-demand periods.

17. The combined-cycle power plant according to claim 10, wherein the discharge of the thermal storage working medium in the thermal storage unit into the steam supplied from the HRSG occurs in instances where it is desirable to provide an energy boost to an electricity supply grid to offset any decrease in frequency on the grid.

18. The combined-cycle power plant according to claim 10, wherein at least one of the at least two heat exchangers is configured to discharge thermal energy from the thermal storage working medium in the thermal storage unit back to the HRSG in order to improve overall plant start-up times and warm-up times of the HRSG.

19. The combined-cycle power plant according to claim 10, wherein the thermal storage working medium comprises an inorganic salt.

* * * * *